United States Patent [19]
Covington

[11] Patent Number: 6,096,199
[45] Date of Patent: *Aug. 1, 2000

[54] OIL FILTER CARTRIDGE WITH TEMPERATURE SENSITIVE BYPASS VALVE

[75] Inventor: Edward A. Covington, Gastonia, N.C.

[73] Assignee: Dana Corporation, Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/741,968

[22] Filed: Oct. 31, 1996

Related U.S. Application Data

[63] Continuation-in-part of application No. 08/653,715, May 23, 1996, Pat. No. 5,833,843, which is a continuation-in-part of application No. 08/556,595, Nov. 13, 1995, Pat. No. 5,690,816.

[51] Int. Cl.⁷ .................................................. B01D 27/10
[52] U.S. Cl. .................... 210/130; 210/149; 137/115.13; 137/512.4; 137/853
[58] Field of Search ..................................... 210/130, 137, 210/149; 137/115.13, 512.4, 853

[56] References Cited

U.S. PATENT DOCUMENTS

| | | | |
|---|---|---|---|
| 2,183,616 | 12/1939 | Korte | 210/165 |
| 2,902,162 | 9/1959 | Humbert, Jr. et al. | 210/438 |
| 2,937,756 | 5/1960 | Humbert, Jr. | 210/444 |
| 3,132,097 | 5/1964 | Tietz | 210/130 |
| 3,231,089 | 1/1966 | Thornton | 210/130 |
| 3,235,085 | 2/1966 | Humbert, Jr. | 210/130 |
| 3,243,045 | 3/1966 | Tietz | 210/130 |
| 3,305,095 | 2/1967 | Hathaway | 210/130 |
| 3,332,554 | 7/1967 | Humbert, Jr. | 210/130 |
| 3,384,113 | 5/1968 | Pennisi | 137/853 |
| 3,529,722 | 9/1970 | Humbert, Jr. | 210/130 |
| 3,557,957 | 1/1971 | Baldwin | 210/130 |
| 3,567,023 | 3/1971 | Buckman et al. | 210/130 |
| 3,785,491 | 1/1974 | Dudinec et al. | 210/130 |
| 4,045,349 | 8/1977 | Humbert, Jr. | |
| 4,127,484 | 11/1978 | Walulik et al. | |
| 4,144,168 | 3/1979 | Thornton | 210/130 |
| 4,732,678 | 3/1988 | Humbert, Jr. | 210/440 |
| 4,872,976 | 10/1989 | Cudaback | 210/130 |
| 5,284,579 | 2/1994 | Covington | 210/130 |
| 5,405,527 | 4/1995 | Covington | 210/130 |

FOREIGN PATENT DOCUMENTS

| | | |
|---|---|---|
| 2171087 | 9/1973 | France . |
| 1045288 | 10/1966 | United Kingdom . |
| 1604831 | 3/1977 | United Kingdom . |

*Primary Examiner*—Matthew O. Savage
*Attorney, Agent, or Firm*—Millen, White, Zelano & Branigan

[57] ABSTRACT

A lubricating oil filter cartridge is disclosed herein. The filter cartridge includes a bypass valve configured and arranged for opening at a selected oil pressure that is substantially higher at low oil temperatures than at the higher operating temperatures to reduce the amount of oil that bypasses the filter at low oil temperatures. The bypass valve is preferably formed of a temperature sensitive elastic material, for example, low swell, high modulus silicone, having an elastic modulus which is substantially higher at low oil temperatures than at higher oil temperatures.

20 Claims, 8 Drawing Sheets

OIL FILTER CARTRIDGE WITH TEMPERATURE SENSITIVE BYPASS VALVE

RELATED PATENT APPLICATIONS

This application is a continuation-in-part of U.S. patent application Ser. No. 08/653,715, filed May 23, 1996, now U.S. Pat. No. 5,833,843, which is a continuation-in-part of Ser. No. 08/556,595, filed Nov. 13, 1995, now U.S. Pat. No. 5,690,816.

FIELD OF THE INVENTION

The present invention relates to improvements in anti-drain back, pressure relieved, filter cartridges. More particularly, the present invention relates to improvements in valve configurations for such filter cartridges and in improvements in configurations for retaining annular filter elements and valve components within filter cartridges.

BACKGROUND OF THE INVENTION

Annular filter elements are mounted in filter housings to form replaceable filter cartridges which are threadably mounted on internal combustion engines. These cartridges are known as "spin-on filters" because they are threadably mounted and removable. If a customer follows the recommended procedures for changing the filter cartridge when lubricating oil is changed, then it is unusual for the filter to clog; however, if the customer fails to change the filter cartridge, or if the lubricating oil becomes contaminated for some other reason, the filter can become clogged or otherwise blocked as to minimize flow of lubricating oil to the engine. If this happens, an engine can be destroyed or seriously damaged.

In order to avoid or at least minimize damage, filter cartridges have been configured to allow oil to bypass filter elements in the cartridges when the filter elements become clogged. The engine is thereafter supplied with at least unfiltered lubricant rather than no lubricant at all, or insufficient lubricant. It is also desirable to keep oil within the filter cartridge when the engine is not running so that when the engine is started, there is no substantial gap in the flow of lubricating oil caused by a slight delay as the filter cartridge refills with oil. This is accomplished by providing an anti-drain back valve which closes when not subjected to pressure from the engine's oil pump so as to prevent draining of oil from the filter back toward the crank case.

Millions of filter cartridges are manufactured every year and millions are disposed of. Since these filter cartridges are disposable, reduction in their cost is highly desirable. One cost reduction approach is to reduce the number of parts and to simplify assembly. Heretofore this has been difficult to accomplish without compromising the effectiveness of the filter cartridges.

In cold environments, lower temperatures of lubricating oil and mechanical components result in higher oil pump pressure and increased filter resistance to flow due to higher lubricating oil viscosity. Current oil filters do not have by-pass valves which accommodate both high operating temperatures after warm up and low temperature, cold startups which are now designed to occur at higher valve opening pressures of 11–14 psi rather than 8–11 psi. The complexity of the situation is further increased because it is desirable after warm-up, that the opening pressure of the bypass valve return to 8–11 psi.

SUMMARY OF THE INVENTION

It is a feature of the present invention to provide a new and improved configuration for anti-drain back/pressure relieved filter cartridges which has an additional advantage that it will not starve an engine for lubricating oil at high temperatures while compensating for cold flow lubrication.

In accordance with the present invention, a bypass valve is disposed between intake and an outlet of a lubricating oil filter cartridge which allows oil to bypass a filter media if the filter media becomes clogged. The bypass valve opens at a higher pressure when the lubricating oil is cold than when it is warm or at operating temperature.

In another aspect of the present invention, a lubricating oil filter cartridge includes a housing with an annular filter element therein and an end plate, the end plate having inlet openings therethrough for allowing unfiltered lubricating oil to enter the housing and a central outlet for allowing filtered oil to pass out of the filter housing. In accordance with the present invention, the improvement comprises an annular valve support disposed between the end plate and the filter element, the annular valve element having an inner sleeve bearing against the end plate proximate the outlet and an outer sleeve with a plurality of holes therethrough for allowing lubricating oil to bypass the filter element when the holes are uncovered by an annular valve member. In order to support the annular filter element, the annular valve support further has a radially extending flange which underlies the annular filter element. The annular valve member has a flexible skirt which functions as an anti-drain back valve and an expandable collar fitting around the outer sleeve of the annular valve support to function as a bypass valve. In order to function as a bypass valve, the expandable collar normally covers the holes but and spreads to uncover the holes when the filter element becomes clogged. Consequently, unfiltered lubricating oil normally passes through the annular filter element, but when the filter element becomes clogged, bypasses the annular filter element and flows through the holes in the annular filter support.

In a further aspect of the invention, the annular valve member is disposed between the annular filter element and the outer sleeve of the annular valve support with the radially extending flap disposed between the radially extending flange of the annular valve support and the filter element.

In still a further aspect of the invention, the annular valve support is made of metal which may, for example, be steel or plastic.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

1) First Embodiment—FIGS. 1–9

Figure 1:
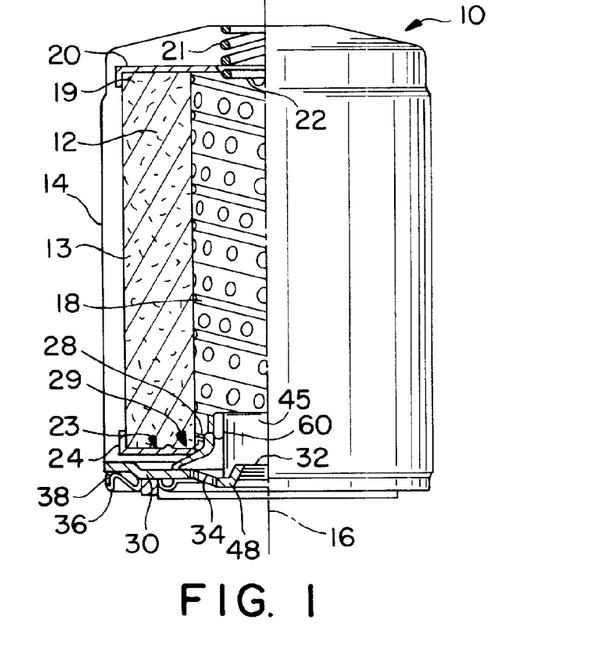
FIG. 1 is a side view, partially in section, of a first embodiment of an anti-drain back/pressure relieved filter cartridge configured in accordance with the principles of the present invention, showing the filter cartridge in an anti-drain back mode when the filter is connected to an engine which is not running.
Figure 2:
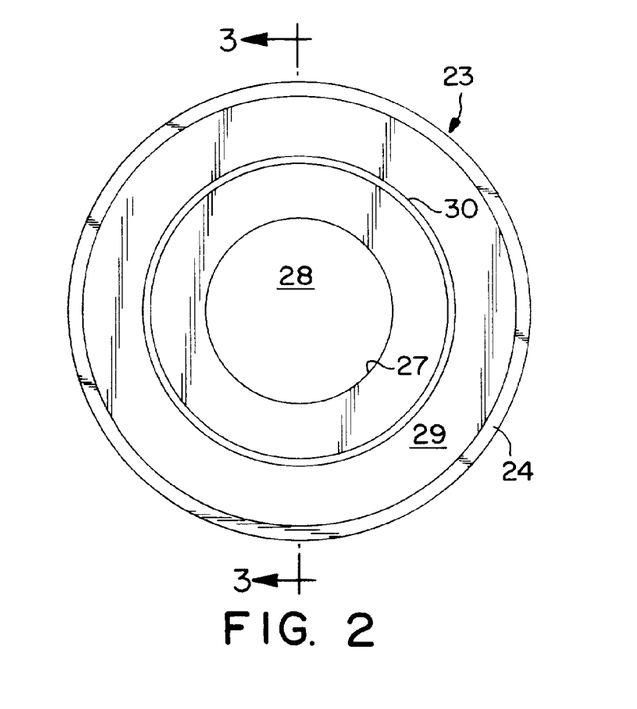
FIG. 2 is an end view of a bottom end cap used with a filter element supported in the filter cartridge of FIGS. 1–3.
Figure 3:
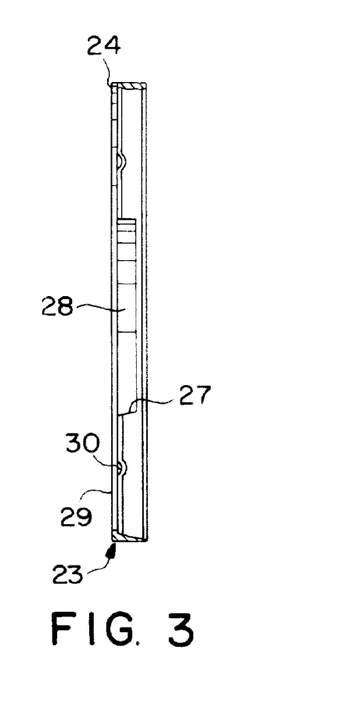
FIG. 3 is a side elevation of the end cap of FIG. 2 taken along lines 3—3 of FIG. 2.

Referring now to FIGS. 1–3, there is shown a lubricating oil filter cartridge 10 configured in accordance with the present invention, wherein the cartridge comprises an annular filter element 12 configured of a conventional pleated paper filter media 13, or some other filter material, contained within a cylindrical housing 14. The annular filter element 12 is concentric with respect to an axis 16 of the cartridge 10 and has a hollow core 18. In FIG. 1, the filter cartridge 10 is shown in the normal operating mode where the oil passes through the filter media 13.

The annular filter element 12 has a first end 19 configured as a closed, dished end cap 20 which is abutted by a spring 21 that is seated in a depression 22 within the closed, dished end cap (see FIGS. 2 and 3). At the second end of the annular filter element 12, there is an annular end cap 23 having an outer axial flange 24 and an inner axial flange 27 surrounding a central opening 28. The inner axial flange 27 is aligned with the hollow core 18 of the filter element. The inner and outer axial flanges are connected to one another via a radially extending plate 29 which has an annular stiffening offset therein.

An end plate 30 encloses the filter element 12 in the housing 14. The end plate 30 includes a threaded outlet 32, coaxial with the axis 16 of the filter cartridge 10 and a plurality of inlet openings 34 (only one of which is shown) disposed in spaced relation with one another around the axis 16 of the cartridge 10. The end cap 30 is held proximate the end of the housing by a cover 36 which is crimped to the bottom end of the housing 14 by a peripheral crimp 38. An annular seal 40 seals the inlet openings 34 with respect to the environment surrounding the filter cartridge 10.

Figure 4:
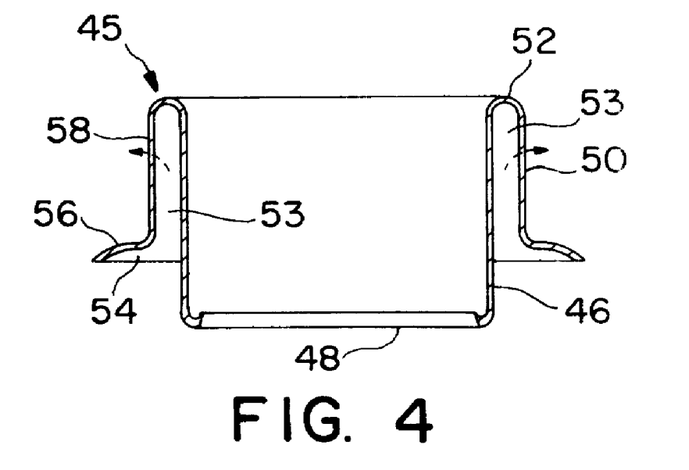
FIG. 4 is a side elevation of a combination valve member and filter element support.
Figure 5:
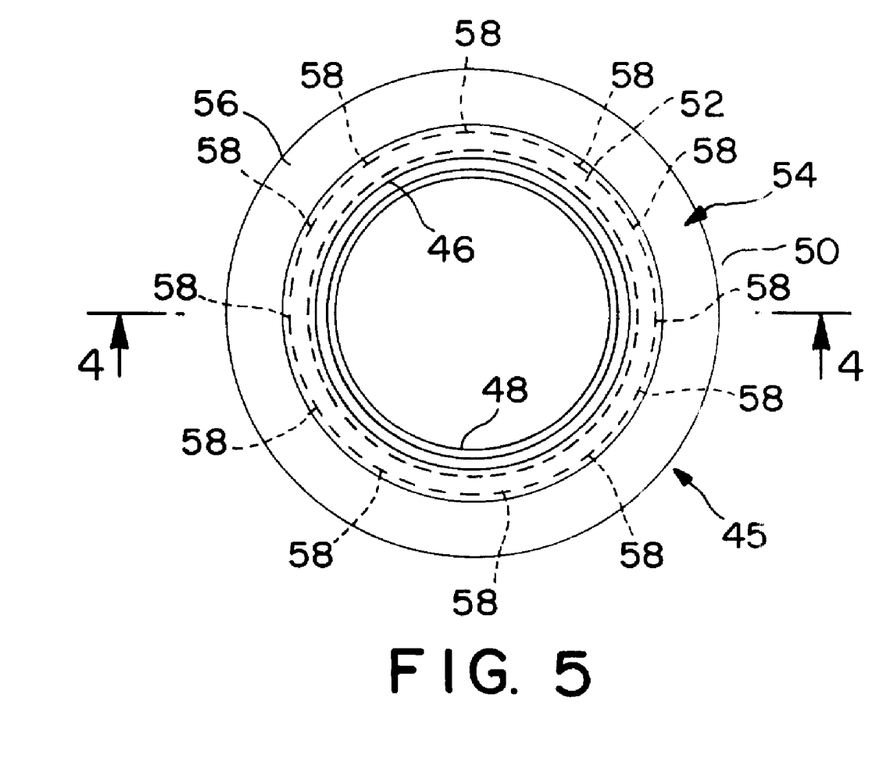
FIG. 5 is an end view of the support of FIG. 4.

Referring now mainly to FIGS. 4 and 5, there is shown a combination valve member and filter element support 45 preferably made of metal. The support 45 has an inner sleeve 46 with an annular rolled stiffener 48 and an outer sleeve 50 which is connected to the inner sleeve by an annular, arcuate bight 52. The outer sleeve 50 has a radial flange 54 extending outwardly therefrom, the radial flange terminating in an upper convex surface 56.

Referring now to FIG. 1 in combination with FIGS. 4 and 5, it is seen that the filter and valve member support 45 is seated against the end plate 30 co-axially with the internally threaded outlet 32. The rolled end stiffener 48 forms an annular foot surrounding the outlet 32. As will be explained in more detail hereinafter, the inner and outer sleeves 46 and 50 of the support 45 are received within the central opening 28 of the end cap 23 shown in FIGS. 2 and 3. The end cap 23 also overlies the radial flange 54 of the combined valve member and filter element support 45.

Figure 6:
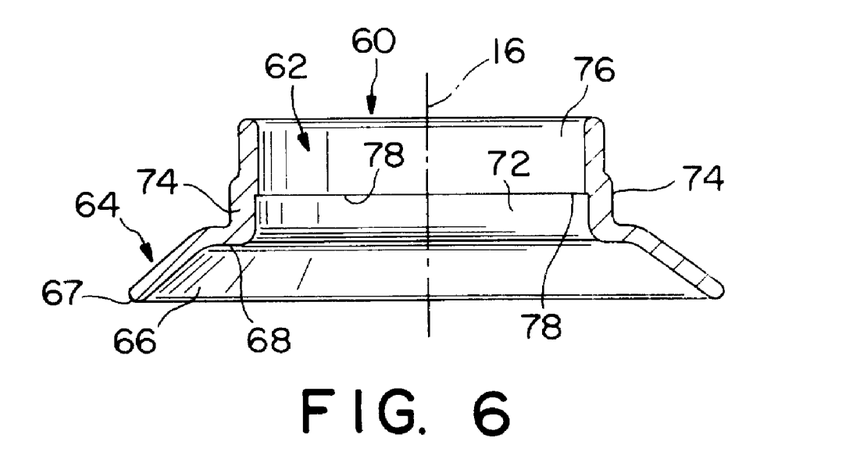
FIG. 6 is a side elevation of an annular valve member incorporating the features of the first embodiment of the present invention which is supported by the annular filter element and valve member support of FIGS. 4 and 5.
Figure 7:
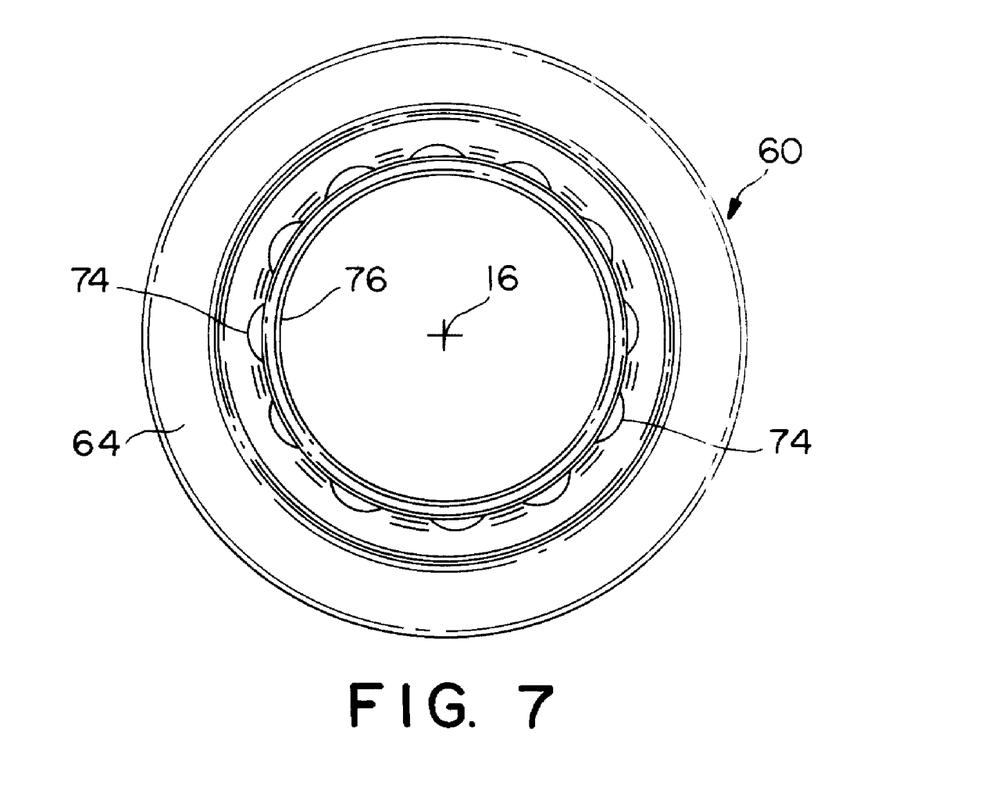
FIG. 7 is a top view of the valve member of FIG. 6.

Referring now to FIGS. 6 and 7, there is shown a valve member 60 which is comprised of an expandable collar portion 62 and a skirt portion 64. The collar 62 is preferably made of a material such as Goshen 2624 which is a rubber material available from the Goshen Rubber Company. The skirt 64 has a frustoconical portion 66 which has a periphery 67 and a generally radial section 68 that joins the frustoconical section to the expandable collar portion 62. Disposed around the exterior of the radial collar portion 62 and a lower section 72 thereof are a plurality of ribs 74. The ribs 74 extend slightly past the lower portion 72 of the expandable collar to overlie an upper portion 76. The upper portion 76 is separated from the lower portion of the expandable collar 62 by a very narrow annular shoulder 78. The upper portion has an inner diameter of about 1/100ths of an inch less than the lower portion 72.

Figure 8:
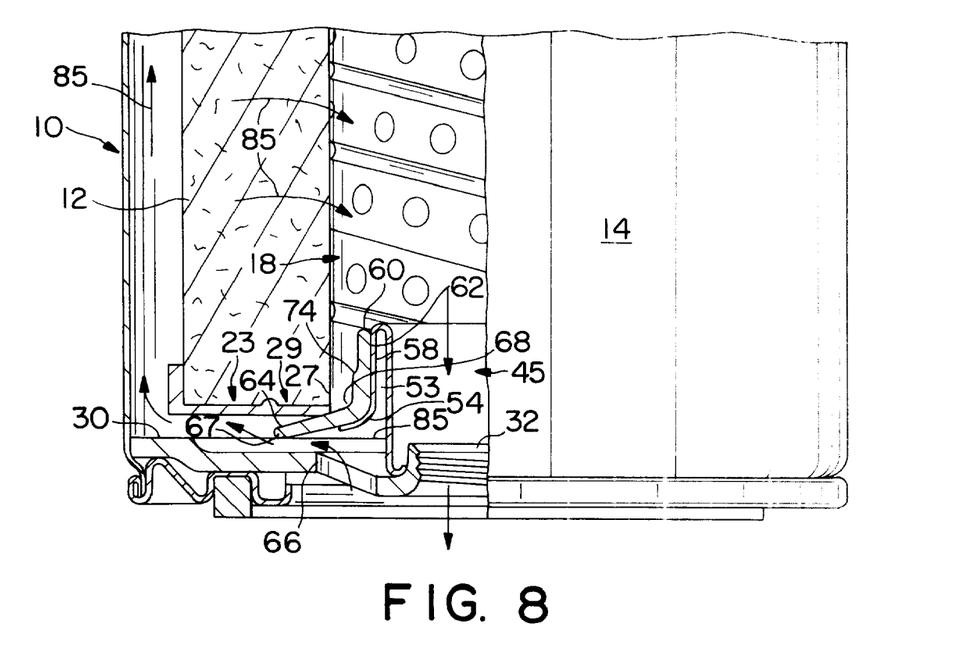
FIG. 8 is an enlarged view of a portion of the filter cartridge of FIG. 1, but showing the filter cartridge in an active mode filtering lubricating oil circulating in an operating engine.
Figure 9:
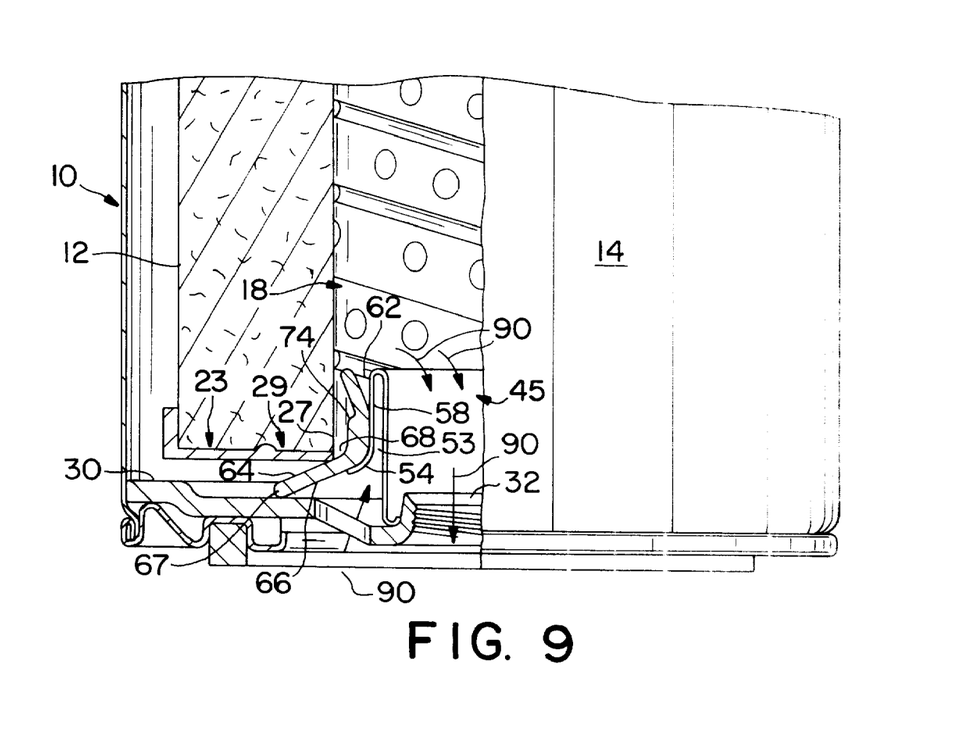
FIG. 9 is a view similar to FIG. 8, but showing the filter cartridge operating in a bypass mode when the filter element is clogged.

The valve member 60 of FIGS. 7 and 8 fits over the combined valve member and filter element support 45 of FIGS. 4 and 5 and, as is seen in FIGS. 1 has the annular end cap 23 of the filter element 12 urged thereagainst by the coil spring 21. As is best seen in FIGS. 8 and 9, the inner axial flange 27 of the end cap 23 is adjacent the ribs 74 on the expandable collar 62 and an inner peripheral portion of the plate 29 abuts the radially extending portion 68 of the skirt 64. The frustoconical portion 66 of the skirt 64 drapes over the upper convex surface 56 of the radial flange 54 with the peripheral end 67 of the skirt resting on the end plate 30.

Normally, when the engine (not shown) to which the canister 10 is connected is not operating (see FIG. 1), lubricating oil in the canister is retained in the canister by the skirt 64 because the frustoconical portion 66 of the skirt prevents lubricating oil from flowing out of the inlet holes 34. Accordingly, the skirt 64 functions as an anti-drain back valve.

As is seen in FIG. 8, when the engine is running, the frustoconical portion 66 of the skirt 64 deflects upwardly, allowing lubricating oil to flow in the direction of the arrows 85, wherein the lubricating oil flows around the outside of the filter element 12 and is forced radially therethrough into the hollow core 18 of the filter element, from which it then flows through the internally threaded out 32 and out of the filter cartridge 10.

When the filter element 12 becomes clogged, then the oil cannot follow the path of the arrows 85, because the oil cannot pass through the filter media 13 comprising the filter element 12. This forces the oil to apply pressure in the space 53 between the inner sleeve 46 and outer sleeve 50. Pressure in the space 53 is also applied through the series of holes 58 to the upper portion 76 of the expandable collar 62.

As is seen in FIG. 9, when the filter element 12 becomes clogged, the expandable collar 62 deflects radially outwardly and the oil follows the direction of the arrows 90, through the holes 58 and into the hollow core 18 of the filter element 12. From the hollow core of the filter element 12, the oil exits through central outlet 32 and is pumped back to the engine without being filtered. While a lubricating oil following the direction of the arrows 90 is unfiltered, it still provides lubricant to the associated engine. This is of course preferable to the engine receiving no lubricant at all due to the filter element 12 being clogged. When the engine is stopped, the upper portion 76 of the expandable collar 62 retracts to its normal position of FIG. 1, sealing the holes 58 to prevent oil from draining from the filter cartridge 10.

With the aforedescribed arrangement, the unitary valve member 60 performs both the pressure relief and anti-drain back functions without the need for an additional spring. By making the valve member 60 of a material such as the preferred material, Goshen 2624, the bias necessary to close the valve member is unitary with its structure.

2) Second Embodiment—FIGS. 10–13

Figure 10:
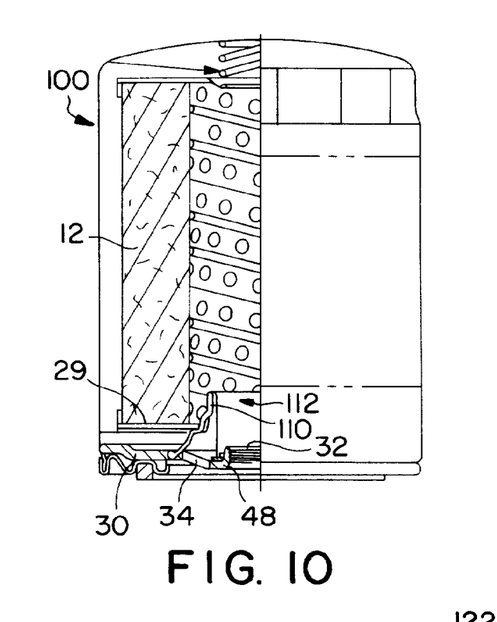
FIG. 10 is a side view, partially in elevation, similar to FIG. 1, but showing a second embodiment of the annular valve member incorporated in the anti-drain back, pressure relieved, filter cartridge of FIG. 1.
Figure 11:
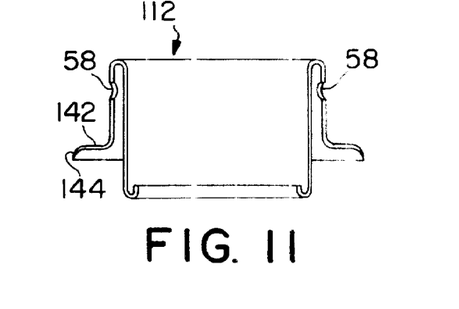
FIG. 11 is a view similar to FIG. 4 of a side elevation of a combination valve member and filter element support for supporting the second embodiment of the annular valve member shown in FIGS. 10, 12 and 13.

Referring now to FIG. 10, FIG. 10 illustrates a second and preferred embodiment of the invention, in which an annular valve member 110 mounted in an anti-drain back, pressure relieved, filter cartridge 100 has a different configuration from the annular valve member 60 of FIGS. 1 and 6–9. The annular valve member 110 is mounted on a combination valve member and filter element support 112 which is similar but not identical to the support 45 in FIGS. 1, 4, 5, 8 and 9. As is seen in FIG. 10, the annular valve member 110 generally has a thinner cross-section than the annular valve member 60 while the support 112 has a depending lip 115 which has a smaller radius and slopes downwardly at a steeper angle (see FIG. 11) than the support 45 of FIGS. 4 and 5.

Figure 12:
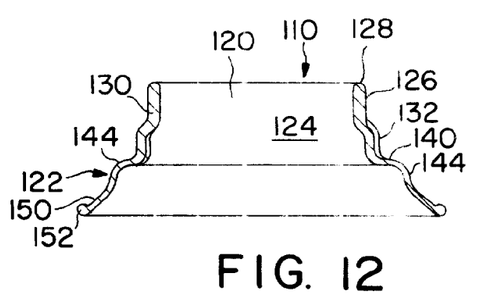
FIG. 12 is a side elevation, similar to FIG. 6, but showing the second embodiment of the annular valve member.
Figure 13:
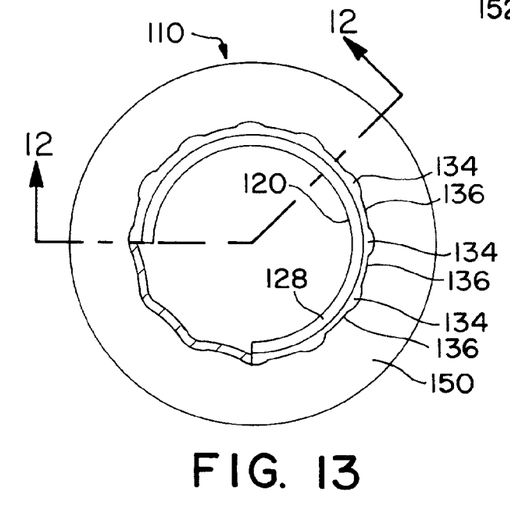
FIG. 13 is a top view, similar to FIG. 7, but showing the second embodiment of the valve member of FIG. 12.

Referring now more specifically to FIGS. 12 and 13, it is seen that the annular valve member 110 includes an expandable collar portion 120 and a skirt 122. The expandable collar portion 120 has a cylindrical inner surface 124 and a cylindrical outer surface 126. The expandable collar portion 120 deflects in substantially the same way as the expandable collar portion 62 deflects from the closed position of FIG. 8 to the open position of FIG. 9. The closed position of FIG. 8 is the position of the collar portion 120 when the filter media 12 is not clogged and the open position of FIG. 9 is the position of the collar portion when the filter media is clogged. The expandable collar 120 deflects with the top edge 128 moving outwardly to uncover the openings 58 in the filter element support 112 when the filter media 12 is clogged and the lubricating oil pressurized. The openings 58 and the support 112 (FIG. 11) correspond to the openings 58 in the support 54 (FIGS. 4 and 5).

In accordance with the second embodiment of the invention, the entire annular valve member 110 is molded of a low swell silicon elastomer. It has been found that a preferred silicon elastomer is Jasper 4229 silicone which is compression molded. By using Jasper 4229 SILICONE available from the Jasper Rubber Company to mold the annular valve 110, the annular valve 110 functions properly when the filter media 12 is clogged in both a cold-flow mode and a normal operating temperature mode.

Collar portion 120 of the annular valve 110 has an outside diameter of about 1.250 inches and an inside diameter of about 1.100 inches, giving the wall of the collar portion a thickness of about 0.150 inch. The collar portion 120 has a height of about 0.192 inch and at its base portion 130 joins a ribbed portion 132.

The ribbed portion 132 includes a plurality of ribs 134 joined by valleys 136. The ribbed portion flares slightly to a diameter of about 1.382 inches and joins a shelf portion 140. The shelf portion 140 rests on a corresponding lip 142 (see FIG. 11) of the support and is held thereagainst by the radially extending end plate 29 which closes the end of the filter media 12. The ribs 132 extend from the shelf 140 back toward the cylindrical portion 120 to stiffen the annular valve 110 and allow flexure at the base 130 of the annular collar 120. Depending from the shelf portion 140, in the opposite direction of the base 130 is a curved portion 144 which drapes over the curved lip 115 (see FIG. 11) of the valve support 112. The curvature of the curved portion 144 has a radius of about 0.078 inches.

Projecting unsupported from the curved portion 144 is a skirt portion 150 which forms the anti-drain back valve. The skirt portion 150 has a bead 152 at the end thereof which engages the end cap 30 of the filter assembly 100. In its relaxed state, the skirt portion 150 has a diameter of about 2.100 inches and flares from the curved portion 144 about a radius of about 0.125 inch. When installed, the skirt portion 150 is deflected upwardly so that it is constantly under a bias to close the inlet ports 34 in the end plate 30. As is seen in FIG. 12, the skirt portion 150 is considerably thinner than the expandable collar portion 112 and has, in a preferred embodiment, a thickness of about 0.030 inch.

As with the embodiment of FIGS. 1–9, the valve skirt portion 150 may be deleted in situations where no anti-drain back function is desired.

Third Embodiment—FIGS. 14–22

Figure 14:
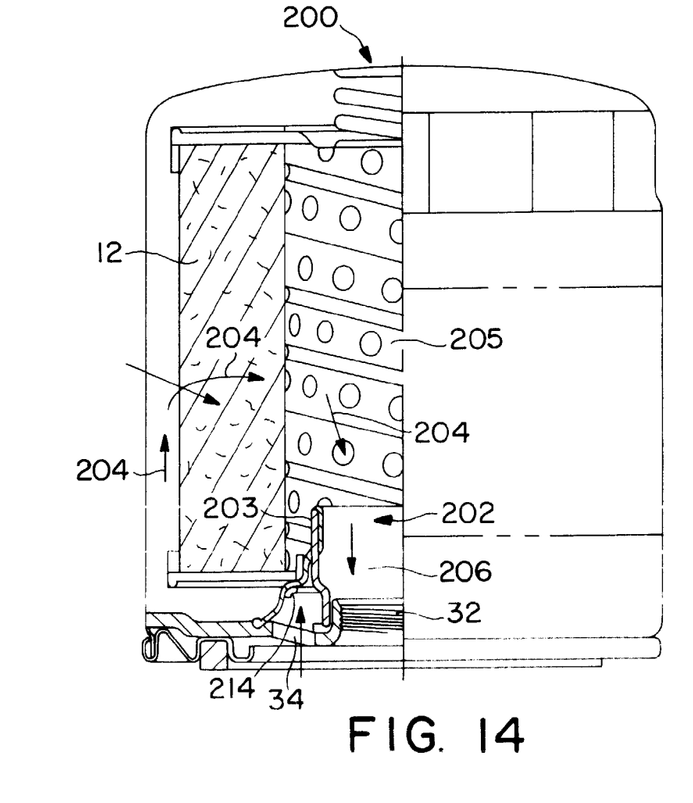
FIG. 14 is a side view, partially in elevation, of a filter cartridge configured in accordance with a third embodiment of the invention and operating in a normal mode to a filter lubricating fluid.

Referring now to FIG. 14, there is shown a third embodiment of the invention wherein a filter cartridge 200, which is similar in many respects to the filter cartridges 10 and 100 of the first and second embodiments, respectively, utilizes a different combination valve member and filter element support 202, as well as a different valve member 203. As with the filter cartridges 10 and 100, in the filter cartridge 200, the oil follows arrows 204 during normal operation by entering the canister 200 through the inlets 34 and flowing through the filter element 12 from the outside in. The lubricating oil then leaves the cartridge 200 by flowing from the central core 205 of the filter element 12 through the central opening 206 of the support 202 and out through the central outlet 32 of the cartridge.

Figure 15:
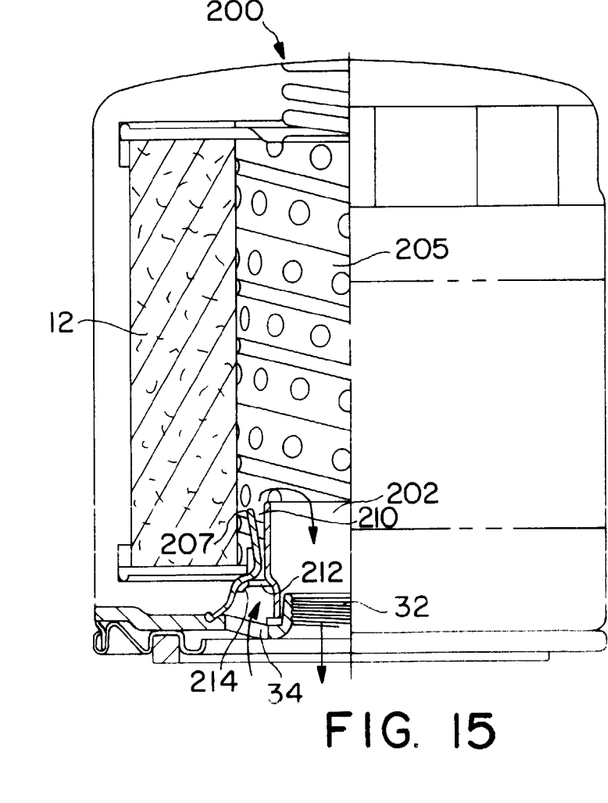
FIG. 15 is a view similar to FIG. 14 but showing the cartridge functioning in a by-pass mode.

As is seen in FIG. 15, an expandable collar 207 having a cylindrical portion 208 expands outwardly when the filter element 12 is clogged and causes back pressure. Back pressure build-up in the space surrounding the filter element 12 is applied at the interface between the collar 207 of the valve member 203 and the support 202 for the valve member. The pressure at the interface causes the expandable collar 207 to separate from the support 202 because of pressurized fluid flowing through an opening 212 in a shelf portion 214. The shelf portion 214 supports both the filter element 12 and the expandable collar 207 of the annular valve member 203.

Figures 16, 17, 18, 19:
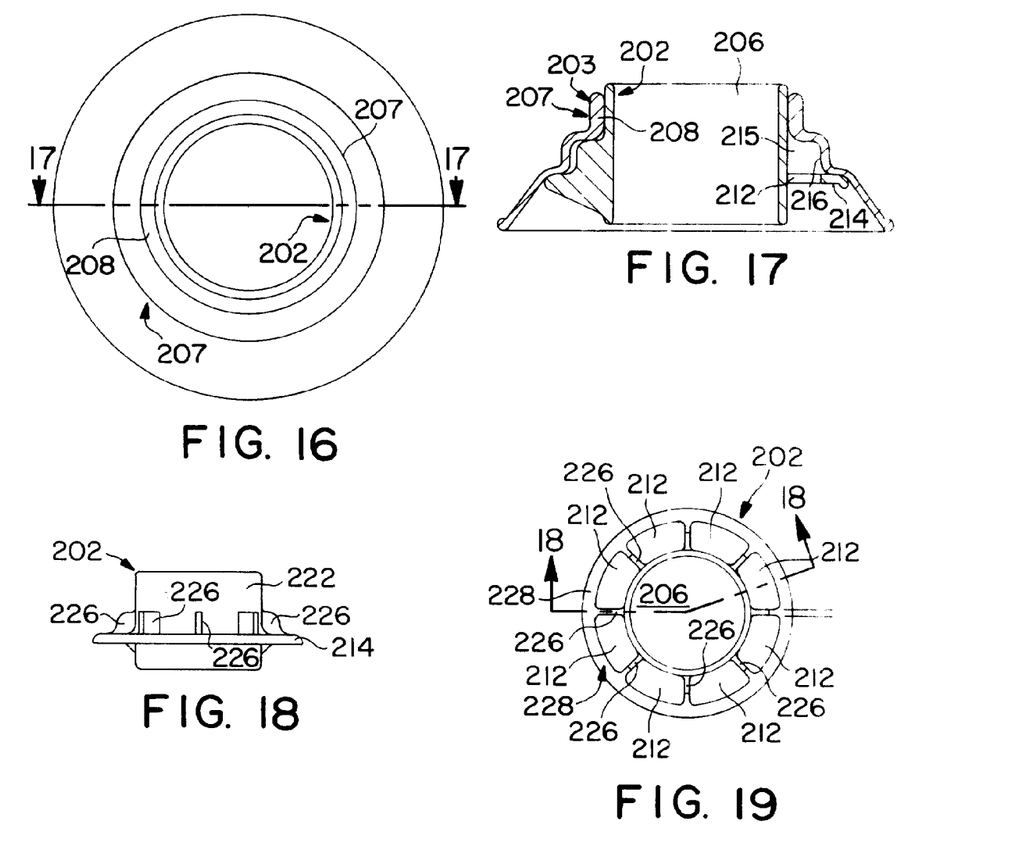
FIG. 16 is a top view of an assembly including a valve member and a support for the valve member and filter element used with the embodiment of FIGS. 14 and 15.
FIG. 17 is an elevation taken along line 17—17 of FIG. 16.
FIG. 18 is a side view of the filter element and valve member support of FIGS. 16 and 17.
FIG. 19 is a top view of the filter element and valve member support of FIG. 18.

Referring now to FIGS. 16 and 17, it is seen generally that the annular valve member 203 is in many respects substantially similar to the annular valve member 110 of FIG. 12.

As is seen in FIG. 17, there is a space 215 in communication with the inlet 34 defined between the inner surface 216 of the cylindrical portion of the annular valve member 203 and the support 202. Pressure in the space 215 remains at a first level during engine operation when the filter cartridge 200 is functioning normally as in FIG. 14. When the filter element 12 is blocked, then there is no pressure relief and pressure in the space 215 rises so as to separate the expandable collar portion 207 from the support 202 to create the space 210 of FIG. 15.

Figure 20:
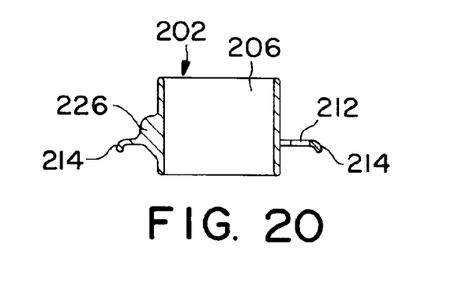
FIG. 20 is a side elevation taken on lines 20—20 of FIG. 19.

Referring now to FIGS. 18–20, where the filter element and annular valve support 202 is shown in detail, it is seen that the support 202 includes a barrel portion 222 defining the hollow central opening 206 (which registers with the outlet 32 of the filter cartridge assembly as is seen in FIGS. 14 and 15). As is seen in FIG. 19, the openings 212 in the lip 214 are defined by ribs 226. As is seen in FIGS. 18 and 20, the ribs 226 project above the lip 214 to provide support for the annular valve member 203. An annular rim 228 extends beyond the ribs 226 to provide the support surface for the annular filter element 12. A preferable material for the filter element and valve support 202 is glass filled nylon.

Figure 21:
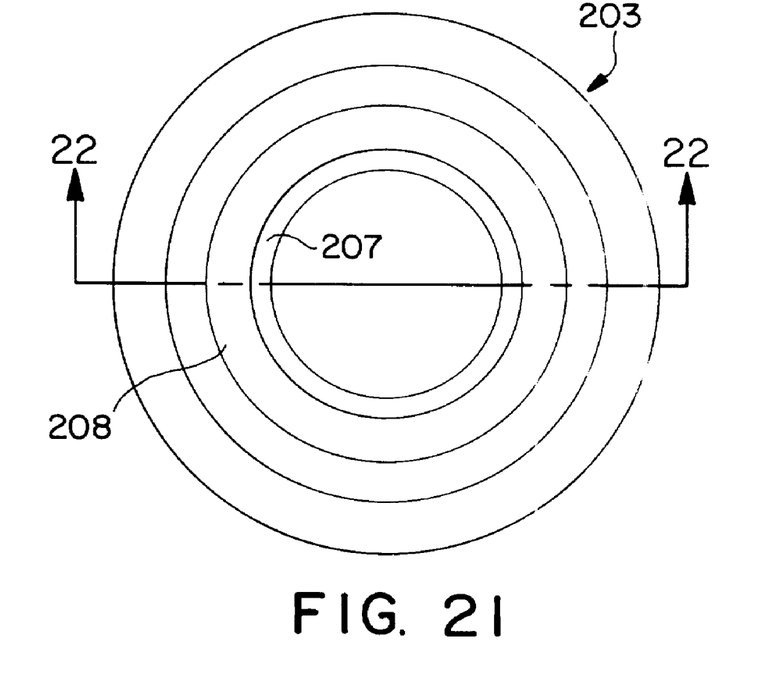
FIG. 21 is a top view of the valve member of FIGS. 16–17.
Figure 22:
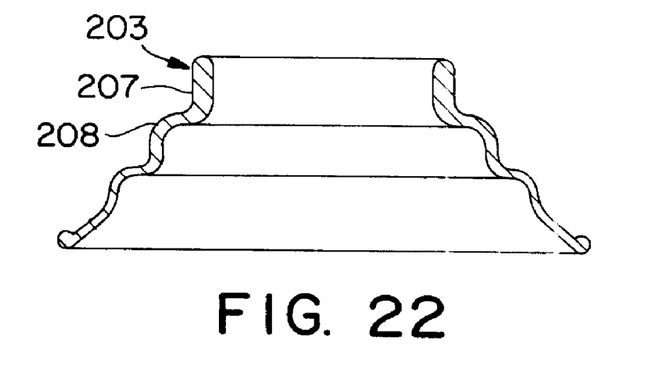
FIG. 22 is a side elevation taken along lines 22—22 of FIG. 21.

Referring now to FIGS. 21 and 22 where the annular valve 203 is shown, it is seen that the primary difference between the annular valve member 203 of FIGS. 21 and 22 and the annular valve member 110 of FIG. 12 is that the annular valve member 203 does not include the ribs and valleys 134 and 136 shown in FIG. 13. This is primarily due to the difference in the supporting structure of the support 202 (see FIGS. 18–20) and the support 45 of the embodiment of FIGS. 4 and 5. With the support member 202, the annular valve member 203 is supported by the ribs 226 and the rim 228, rather than by a cylindrical outer sleeve 50. Like the annular valve member 110, the annular valve member 203 is molded of low swell, silicon elastomer, such as Jasper 4229 silicone, available from the Jasper Rubber Company, which is silicone compression molded.

By molding the annular valve members 110 and 203 of low swell silicone materials, such as Jasper 4229 SILICONE, and properly dimensioning the collar portions 120 and 208, the valve members compensate for cold flow filtration while not starving an engine for oil at high temperatures when the filter medium becomes clogged. Further to this point, original equipment engine manufacturers are raising opening pressures of bypass valves for filters which filter lubricating oil. This is due to higher flow rates of unfiltered oil during cold starts. During normal operating temperatures, the opening pressure is in the range of about 8–10 psi, but for cold starts, new design parameters specify opening pressures in the range of about 11–14 psi. The annular valve members 110 and 203 accommodates this situation by utilizing low swell silicone which increases in elasticity as the temperature rises.

In cold environments, low temperatures of lubricating oil and mechanical components increases oil viscosity, resulting in oil pumps producing higher pressures. The silicone elastomer of the valve members 110 and 203 increases in elastic modulus and temperature strength as temperatures drop, resulting in substantially higher opening pressures of, for example, 11–14 psi at temperatures of, for example, –30° F. and lower opening pressures at engine operating temperatures of 180° F. Typically, this standard opening pressure at 180° F. of a warmed up engine is in the range of 8–10 psi. By utilizing the second embodiment of the invention, when a filter media 12 becomes clogged, bypass of the filter media is effective over a wide temperature range to minimize engine damage due to uncirculated lubricant.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lubricating oil filter cartridge for filtering oil in a machine at both low oil temperatures and at higher oil temperatures wherein the oil is more viscous at low temperatures than at higher temperatures, resulting in higher oil pressure in the filter cartridge at low temperatures than at the higher temperatures, the filter cartridge comprising:

a filter media within the cartridge;

a primary path within the cartridge for lubricating oil to flow from an inlet of the cartridge, through the filter media and out of an outlet of the cartridge when the filter media is unclogged;

a bypass path within the cartridge for bypassing the filter media, the bypass path connecting the inlet to the outlet when the filter media is clogged; and a bypass valve disposed between the inlet and the outlet, the bypass valve being configured and arranged for opening at a selected oil pressure indicative of the filter media being clogged, the selected pressure being substantially higher at the low oil temperatures than at the higher oil temperatures, whereby the by-pass valve compensates for cold flow filtration while not starving the machine for oil at higher temperatures when the filter media becomes clogged.

2. The lubricating oil filter cartridge of claim 1, wherein the bypass valve comprises a temperature sensitive elastic material having an elastic modulus which is substantially higher at the low oil temperatures than at the higher oil temperatures.

3. The lubricating oil filter cartridge of claim 2, wherein the material is low swell, high modulus silicone.

4. The lubricating oil filter cartridge of claim 3, wherein the bypass valve is a collar mounted on a cylindrical support, the cylindrical support being mounted between the inlet and outlet and having apertures therethrough covered by the collar when the filter is unclogged and the lubricating oil is pressurized and uncovered by the collar when the filter is clogged and the lubricant is pressurized.

5. The lubricating oil filter cartridge of claim 4, wherein the collar further includes a skirt depended therefrom which overlies the intake, the skirt being an anti-drainback valve biased to close the intake if the lubricating oil is unpressurized and to open the intake if the lubricating oil is pressurized.

6. The oil filter lubricating cartridge of claim 1, wherein the by-pass valve is configured as a valve member mounted on an annular support, wherein the annular support includes a cylindrical portion aligned with the outlet of the cartridge, the cylindrical portion having a plurality of apertures therethrough, and wherein the annular support includes a radially extending shelf portion, the valve member further including an expandable collar portion disposed around the cylindrical portion and a skirt portion overlying the shelf portion, whereby upon the filter media becoming clogged, the expandable collar separates from the cylindrical portion of the support allowing the lubricating oil to flow from the apertures in the shelf and between the expandable collar and cylindrical portion of the support.

7. The lubricating oil filter cartridge of claim 6, wherein the skirt portion extends to overlie the inlet to provide an anti-drainback valve biased to close the inlet if the lubricating oil is unpressurized and to open the inlet of the lubricating oil is pressured.

8. The lubricating oil filter cartridge of claim 7, wherein the filter media is an annular filter media which is supported by the shelf portion of the support.

9. The lubricating oil filter cartridge of claim 8, wherein the material is low swell, high modulus silicone.

10. The lubricating oil filter cartridge of claim 6, wherein the material is low swell, high modulus silicone.

11. A lubricating oil filter cartridge for filtering lubricating oil of an internal combustion engine wherein the oil filter includes a bypass valve and wherein at startup of the engine the oil temperature may be sufficiently low to increase the viscosity of the lubricating oil by oil pressure in the cartridge substantially above the pressure at which the bypass valve opens at higher temperatures of the oil when the engine is warmed up, the filter cartridge comprising:

a filter media within the cartridge;

a primary path within the cartridge for lubricating oil to flow from an inlet of the cartridge, through the filter media and out of an outlet of the cartridge when the filter media is unclogged;

a bypass path within the cartridge bypassing the filter media and going substantially from the inlet to the outlet when the filter media is clogged; and a bypass valve disposed between the inlet and the outlet, the bypass valve being configured and arranged for opening at a selected oil pressure indicative of the filter media being clogged, the selected pressure being substantially higher at the low oil temperatures than at the higher oil temperatures occurring when the engine is warmed up, whereby the by-pass valve compensates for cold flow filtration while not starving the internal combustion engine for oil at higher temperatures when the filter media becomes clogged.

12. The lubricating oil filter cartridge of claim 11, wherein the bypass valve comprises a temperature sensitive elastic material having an elastic modulus which increases as temperature drops.

13. The lubricating oil filter cartridge of claim 12, wherein the material is low swell, high modulus silicone.

14. The lubricating oil filter cartridge of claim 13, wherein the bypass valve is a collar mounted on a cylindrical support, the cylindrical support being mounted between the inlet and outlet and having apertures therethrough in communication with the outlet of the cartridge covered by the collar when the filter is unclogged and the lubricating oil is pressurized and uncovered by the collar when the filter is clogged and the lubricant is pressurized.

15. The lubricating oil filter cartridge of claim 14, wherein the collar further includes a skirt depended therefrom which overlies the inlet, the skirt being an anti-drainback valve biased to close the inlet if the lubricating oil is unpressurized and to open the inlet if the lubricating oil is pressurized.

16. The lubricating oil filter cartridge of claim 11, wherein the by-pass valve is configured as a valve member mounted on an annular support, wherein the annular support includes a cylindrical portion aligned with the outlet of the cartridge, the cylindrical portion having a plurality of apertures therethrough, and wherein the annular support includes a radially extending shelf portion, the valve member further including an expandable collar portion disposed around the cylindrical portion and a skirt portion overlying the shelf portion, whereby upon the filter media becoming clogged, the expandable collar separates from the cylindrical portion of the support allowing the lubricating oil to flow and through between the expandable collar and cylindrical portion of the support and through the apertures to the outlet of the cartridge.

17. The lubricating oil filter cartridge of claim 16, wherein the skirt portion extends to overlie the intake to provide an anti-drainback valve biased to close the intake if the lubricating oil is unpressurized and to open the intake of the lubricating oil is pressured.

18. The lubricating oil filter cartridge of claim 17, wherein the filter media is an annular filter media which is supported by the shelf portion of the support.

19. The lubricating oil filter cartridge of claim 18, wherein the material is low swell, high modulus silicone.

20. The lubricating oil filter cartridge of claim 16, wherein the material is low swell, high modulus silicone.

* * * * *